United States Patent
Bari

(10) Patent No.: US 7,787,600 B1
(45) Date of Patent: Aug. 31, 2010

(54) HANDLING EMERGENCY CALLS USING EAP

(75) Inventor: Farooq Bari, Bothell, WA (US)

(73) Assignee: AT&T Mobility II, LLC, Atlanta, GA (US)

( * ) Notice: Subject to any disclaimer, the term of this patent is extended or adjusted under 35 U.S.C. 154(b) by 1077 days.

(21) Appl. No.: 11/318,687

(22) Filed: Dec. 27, 2005

Related U.S. Application Data

(60) Provisional application No. 60/724,394, filed on Oct. 7, 2005.

(51) Int. Cl.
*H04M 11/00* (2006.01)
*H04L 12/66* (2006.01)

(52) U.S. Cl. .................................... 379/45; 370/352
(58) Field of Classification Search .................. 370/352; 379/45
See application file for complete search history.

(56) References Cited

U.S. PATENT DOCUMENTS

| | | | | |
|---|---|---|---|---|
| 7,177,399 B2 * | 2/2007 | Dawson et al. | ................. | 379/45 |
| 7,277,705 B2 * | 10/2007 | Casaccia et al. | .......... | 455/435.1 |
| 2006/0078094 A1 * | 4/2006 | Breen et al. | .................... | 379/45 |
| 2006/0078095 A1 * | 4/2006 | Crago et al. | .................. | 379/45 |
| 2007/0003024 A1 * | 1/2007 | Olivier et al. | ................. | 379/45 |

* cited by examiner

*Primary Examiner*—Curtis Kuntz
*Assistant Examiner*—Mohammad K Islam
(74) *Attorney, Agent, or Firm*—Turocy & Watson, LLP

(57) ABSTRACT

A user (terminal) is allowed to make an emergency voice-over-Internet Protocol (VoIP) phone call through an access network, such as a wireless local area network (WLAN) using Extensible Authentication Protocol (EAP). The emergency call can be made with or without authentication credentials and is identified by the user's terminal transmitting a Network Access Identifier (NAI) having a user part and/or realm part that indicates the emergency nature of the call, such as e911@e911.com. In response to such an NAI, the caller can be immediately granted limited authentication for the purpose of connecting to an emergency call center. Alternatively, the user (terminal) can be authenticated through networks supporting emergency calls, such as the user's home network, if the terminal indicates to the access network authentication server a preference or requirement for using such networks. The call can be routed to the emergency call center either directly or via one or more intermediary networks, such as networks that support emergency VoIP phone calls.

20 Claims, 5 Drawing Sheets

HANDLING EMERGENCY CALLS USING EAP

CROSS-REFERENCE TO RELATED APPLICATIONS

The benefit of the filing date of U.S. provisional patent application Ser. No. 60/724,394, filed Oct. 7, 2005, entitled HANDLING EMERGENCY CALLS WITH INTELLIGENT NETWORK ADVERTISEMENT FOR NETWORK SELECTION USING EAP, is hereby claimed, and the specification thereof is incorporated herein by this reference.

BACKGROUND OF THE INVENTION

1. Field of the Invention

The present invention relates generally to access networks, such as wireless local area networks (WLANs) and, more specifically, to a mechanism for requesting and admitting an emergency Voice over Internet Protocol phone call through an access network in which Extensible Authentication Protocol (EAP) is used.

2. Description of the Related Art

Telephone (voice) calls can be placed not only through the public telephone network and wireless (e.g., cellular) telephone networks but also through data networks such as the Internet. The most common technology for transmitting voice calls through data networks is known as Voice over Internet Protocol (VoIP). A person can place a VoIP call using an computer equipped with a microphone and speaker and suitable software, or using a desktop VoIP telephone, handheld VoIP telephone, or any other user terminal that can encode and transmit voice in accordance with IP and associated protocols.

In some respects, VoIP lags behind the more well-established telephone technologies. For example, while there are well-established mechanisms for ensuring that calls placed to emergency operators through the public telephone network (e.g., by dialing "911" in the United States and similar numbers in other countries) are properly handled, mechanisms for doing so through data networks are still under development. Some of the issues that need to be addressed in developing such mechanisms include how the call is admitted through an access network and how to handle authentication of the user.

A wireless local area network (WLAN) is a type of access network in which data is transmitted by radio communication between the user's terminal and a nearby device known as an access point. The access point, in turn, is part of the access network, and the user can transparently access computers or other devices connected to the access network from the user's terminal, as though the user's terminal were connected to the network via a wired connection. For example, a user having a wireless VoIP terminal can place a telephone call through the access network in a manner very similar to that in which one can place a telephone call using a cellular telephone.

A WLAN standard developed by the Third-Generation Partnership Program (3GPP), a consortium of telecommunications standards bodies operating under a collaboration agreement, provides an architecture in which a user's terminal can connect via a WLAN to a remote data network, such as the Internet or a core network of cellular telecommunication systems. The mechanism as it applies to cellular telecommunication operators inter-working with WLANs is defined in 3GPP's Release 6 documents, TS 23.234 and TS 24.234.

"Public WLAN" is a term that refers to the placement of access points in publicly accessible areas, such as airport lounges, waiting rooms, and coffeehouses, giving rise to areas known as "hotspots" in which users can access remote networks to check e-mail, surf the Internet, upload and download files, and so forth. Accordingly, a user having a suitable wireless VoIP terminal in a hotspot can place a VoIP telephone call. However, not all WLANs (or access networks supporting IP transport) are able to handle emergency VoIP calls. This lack of support for VoIP emergency calls in many public WLANs is due to two main reasons. Firstly, not all public WLANs are capable of routing emergency calls (with appropriate information such as location) to emergency call centers. Secondly, WLANS are not able to recognize and thereby admit users making emergency calls without appropriate credentials.

Generally, when a user initially attempts to use an access network to gain access to remote networks, one or more "authentication, authorization and accounting" (AAA) processes occur to ensure that the user is authorized to use the network and that the user can be billed accordingly (generally, through the user's home network, such as one that provides the user with data and voice (e.g., cellular, VoIP, etc.) telecommunications services). The user's home network includes an AAA server that performs AAA functions in conjunction with an AAA proxy server that is part of the access network. The authentication process involves routing AAA information to the user's home network's AAA server. Because all public WLAN operators may not have roaming agreements directly with the operator of the user's home network, routing in such cases must occur via one or more intermediary networks or brokers, whose operators have roaming agreements with the WLAN operator, the user's home network operator, or other intermediary network operators.

The Internet Engineering Task Force (IETF), an open consortium of network designers, operators, vendors, and researchers concerned with the evolution of the Internet architecture and the smooth operation of the Internet, has defined a protocol known as Extensible Authentication Protocol (EAP) that provides an authentication framework supporting multiple authentication methods. EAP can be used by various access network technologies, including WLAN technology.

One difficulty in the authentication process is selecting the intermediary network(s) through which to route the AAA information. In the most common authentication schemes, the user's terminal plays a primary role in the selection of intermediary networks. 3GPP has suggested the use of EAP to have the WLAN provide or "advertise" information or "hints" to the user's terminal to aid the terminal in selecting one or more intermediary network(s) through which to route the AAA information. The information can be, for example, a list of the WLAN operator's roaming partners, i.e., intermediary operators with whom the WLAN operator has a roaming agreement. 3GPP's suggestion includes that the terminal indicate the selected routing by inserting information into or "decorating" a Network Access Identifier (NAI) and transmitting it to the WLAN.

There may also be potential intermediary networks that do not have the capability of properly routing emergency calls in the manner in which such calls are required to be routed in the public switched telephone network (PSTN) and certain other networks. For example, when a person dials "911" on an ordinary landline telephone, the switching office not only connects the caller to an emergency call center but also obtains the caller's location and transmits that information to the call center as well. Therefore, when a caller is initiating an emergency call via an access network such as a WLAN, it would be desirable to route such location information along with the call to the local emergency call center and to otherwise handle the emergency call in a manner analogous to that in which such calls are handled in the PSTN, even in cases in which the caller cannot be authenticated in the conventional manner. Accordingly, it can be seen that a need remains in the art for a system and method for admitting and routing an emergency phone call through an access network. It is to such a system and method that the present invention is primarily directed.

SUMMARY OF THE INVENTION

The present invention relates to a system and method for recognizing and admitting an emergency voice-over-Internet Protocol (VoIP) phone call in an access network, such as a wireless local area network (WLAN) using Extensible Authentication Protocol (EAP). In accordance with one or more exemplary embodiments of the invention, an authentication server of the access network receives information indicative of emergency calling. The information can, for example, include information in the form of a Network Access Identifier (NAI) having a user part and/or realm part that indicates the emergency nature of the call. In response to this information, the authentication server authenticates the user to allow the terminal access to an emergency call center.

In one preferred form, the authentication server can grant the user (terminal) access that is limited to placing the emergency call, regardless of whether the user can be authenticated. In such embodiments of the invention, the access network has the capability of handling emergency calls in a manner consistent with any applicable government regulations or other requirements, e.g., it has the capability of not only connecting the user to a local emergency call center but also transmitting its location to the emergency call center. Thus, the authentication server responds to the identifying information, such as an NAI of the type described above, by granting limited authentication credentials, thereby allowing the access network to connect the user to the local emergency call center and perform any other actions consistent with proper handling of emergency calls, such as transmitting location information.

In another preferred form, the access network routes the emergency call to an emergency call center via one or more intermediary network operators. In such embodiments of the invention, each of the intermediary network operators has the capability of handling emergency calls, thereby allowing the user's location or other information relating to the emergency call to be passed along through each successive intermediary network operator to the emergency call center. The intermediary network operators can be selected in any suitable manner. For example, the authentication server can advertise one or more intermediary network operators to the terminal that can handle emergency calls, and the terminal can select one or more of the advertised operators. A list of such operators can be pre-stored in the authentication server. By indicating its home network to the authentication server in addition to its selection of intermediary network operators, the terminal can be authenticated with the home network via the path of intermediary operators.

In some forms of the invention, the terminal can indicate at the time of authenticating with a WLAN (or its roaming partner) for a normal session, a preference for networks that support emergency calls. For example, the terminal can be provisioned to transmit an indication in the form of a special NAI that not only indicates the user's own identity along with his home network identity but also a user preference to be on a network that supports VoIP emergency calls. In an EAP response to an indication of such a preference, the WLAN can advertise to the terminal one or more networks that support VoIP emergency calls.

DETAILED DESCRIPTION

Figure 1:
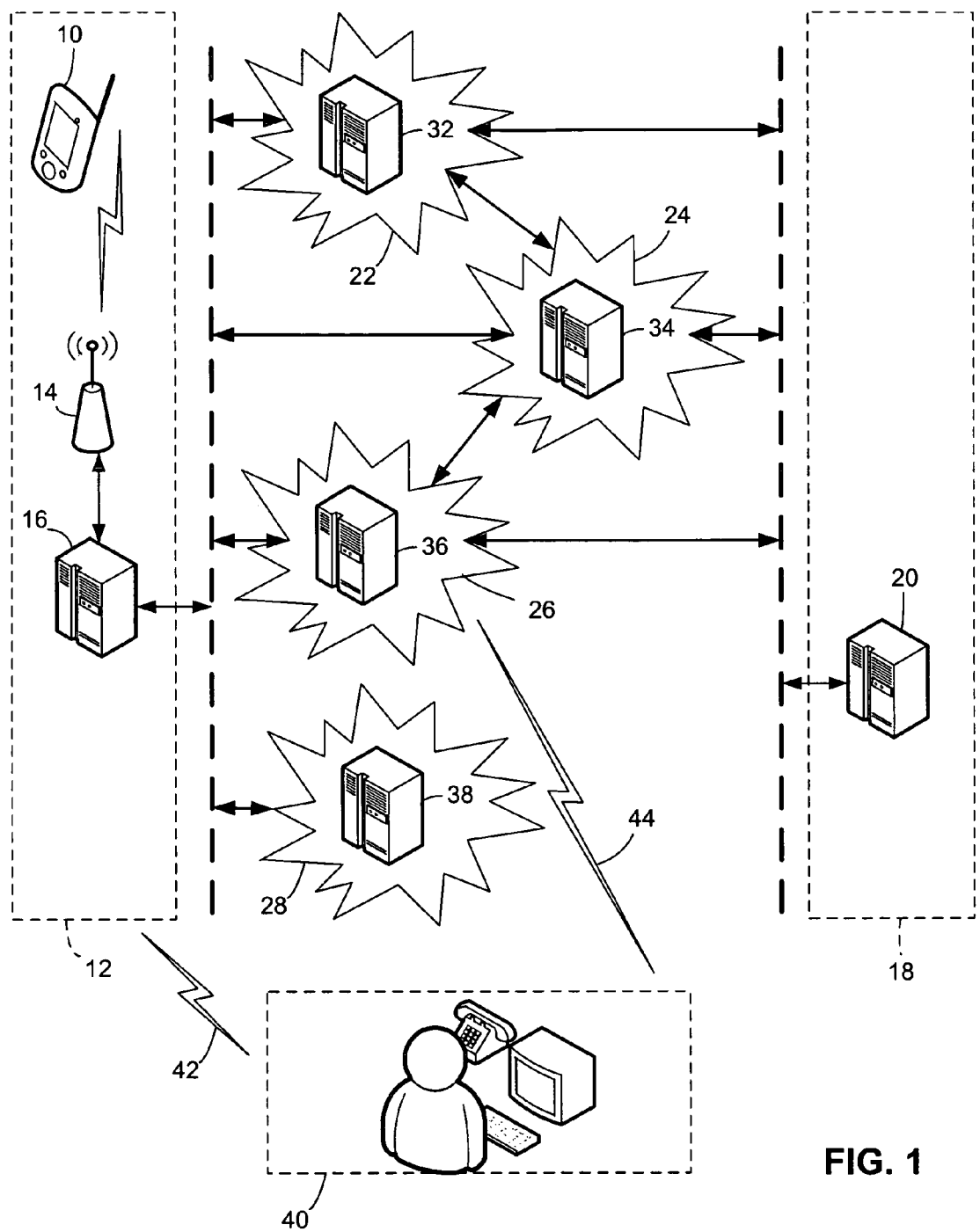
FIG. 1 illustrates an exemplary embodiment of a system in which an emergency voice-over-Internet Protocol (VoIP) phone call is admitted and routed through a wireless local area network (WLAN).

In the following description, like reference numerals indicate like components to enhance the understanding of the invention through the description of the drawings. Also, although specific features, configurations, arrangements and steps are discussed below, it should be understood that such specificity is for illustrative purposes only. A person skilled in the relevant art will recognize that other features, configurations, arrangements and steps are useful without departing from the spirit and scope of the invention.

As illustrated in FIG. 1, a user in possession of a terminal 10 having the capability of placing Voice over Internet Protocol (VoIP) telephone calls, such as a wireless personal digital assistant (PDA), VoIP cellular telephone, VoIP-enabled laptop computer, etc., may need to obtain help in an emergency. If terminal 10 is in an area in which an access network 12 provides wireless local area network (WLAN) coverage, also referred to in the art as a "hotspot," the user can place an emergency VoIP telephone call using a system similar to that in which the public switched telephone network has long routed emergency calls to emergency call centers, where operators can speak with the callers, view the callers' locations on a screen, and provide assistance.

If the user dials a telephone number associated with such an emergency call center system, such as "911," terminal 10 first initiates communication for authentication purposes with an access point 14. Access point 14 in turn allows terminal 10 to communicate with an authentication, authorization and accounting (AAA) proxy server or similar type of AAA server 16. Access point 14 can be located in the conventional manner in, for example, a public or semi-public area such as an airport lounge, coffeehouse, waiting room, etc., as known in the art.

The user of terminal 10 belongs to a home network (HN) 18. That is, the user has a subscription agreement with an operator of network 18 through which the operator provides the user with telecommunications services, which include data network access and may also include cellular telephone services and other such services. Accordingly, charges for accessing computer networks via remote access networks, such as access network 12, can be included in the normal monthly bill that the user receives from the operator of network 18. The operator of network 18 can ensure that the operator of access network 12 receives compensation for the user's use of access network 12 in accordance with agreements among the parties involved. Generally, to authenticate the user's identity and thereby ensure that the user can be properly billed in this manner, an authentication process must be performed. The authentication process can involve what is referred to in the art as a "conversation" between AAA server 16 and a similar AAA server 20 of the user's home network 18. The conversation comprises an exchange of electronic messages. Generally, i.e., except as otherwise described herein, only if the user is successfully authenticated with the user's home network as a result of such an authentication conversation does AAA server 16 allow terminal 10 to place a VoIP telephone call or otherwise access devices that are part of or interconnected with access network 12.

In addition to the user's home network 18 and access network 12, there may be one or more intermediary networks 22, 24, 26, 28, etc., involved in the authentication process. (There can be more or fewer such intermediary networks, interconnected with one another or with other networks in any suitable manner, and the networks 22-28 shown in FIG. 1 and manner (or network topography) in which they are shown to be interconnected is merely intended to be exemplary for purposes of illustration.) Intermediary networks 22-28, etc., can be any suitable type of network and may be similar to the user's home network 18 and operate in a manner similar to that in which the user's home network 18 operates. One or more of intermediary networks 22-28 can be selected to form a path or chain through which to route information between AAA server 16 and AAA server 20 during the authentication conversation.

The operator of access network 12 can have roaming agreements with one or more of intermediary networks 22-28, as indicated by the arrows in FIG. 1. Operators of intermediary networks 22-28 who have roaming agreements with each other are also called roaming partners. In the exemplary roaming partner arrangement indicated in FIG. 1 by arrows, the operator of access network 12 is a roaming partner with each of the operators of intermediary networks 22-28. In addition, the operators of intermediary networks 22 and 24 are roaming partners with each other, as are the operators of intermediary networks 24 and 26. The operator of home network 18 is also a roaming partner with each of the operators of intermediary networks 22, 24 and 26 (but not 28). Each of intermediary networks 22, 24, 26 and 28 has its own AAA server 32, 34, 36 and 38, respectively.

In accordance with the present invention, in instances in which a user attempts to place an emergency telephone call (e.g., by dialing "911"), the authentication and routing methods described below can be used to ensure that the call reaches a call center 40 that is local to, i.e., in the same geographic area as, access network 12, so that emergency personnel or other assistance can be readily dispatched to the user's location if necessary. One issue addressed by the present invention is that not all such access networks and intermediary networks have the capability of handling emergency telephone calls in a manner consistent with applicable government regulations or other requirements, e.g., they may not be capable of both connecting the user to a local emergency call center and transmitting the user's location to the call center. Another issue is that attempting to authenticate a user in an emergency may waste time and thereby endanger lives. For purposes of illustration, in a first example described below, access network 12 is itself capable of handling emergency calls, as indicated by a communication link symbol 42 between it and emergency call center 40. In a second example described below, intermediary network 26 is capable of handling emergency calls, as indicated by another communication link symbol 44 between it and emergency call center 40.

Figure 2:
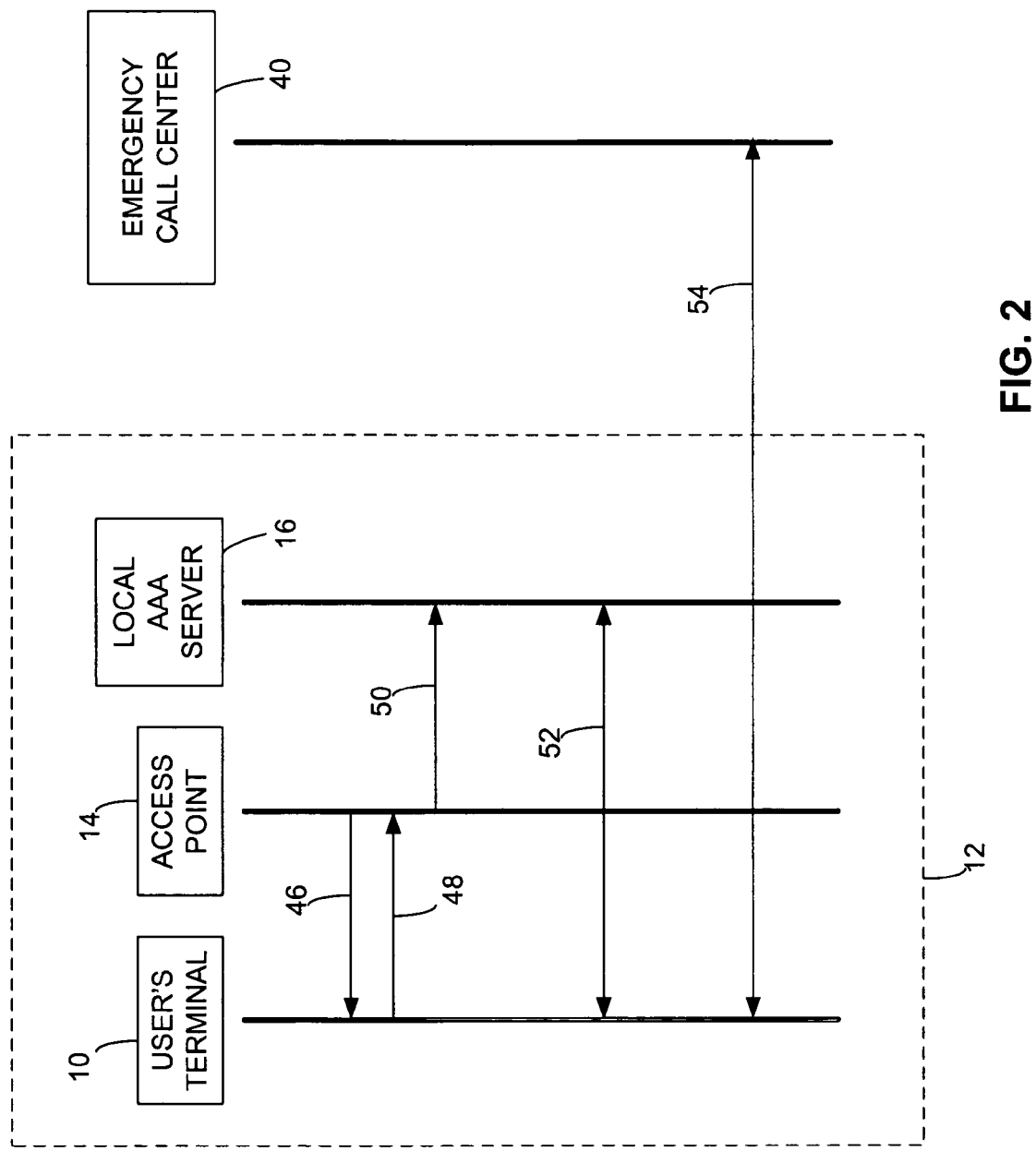
FIG. 2 is a communication sequence diagram illustrating an exemplary sequence of communications among the elements depicted in FIG. 1.

As illustrated in FIG. 2, an example of an instance in which a user of terminal 10 attempts to place an emergency VoIP telephone call can comprise the following exemplary sequence of communications. When terminal 10 is in the hotspot and the user dials "911," terminal 10 initiates communication with access point 14. Access point 14 communicates 46 an Extensible Authentication Protocol (EAP) Identity Request to terminal 10. EAP is a protocol that defines how messages are communicated between an authenticator (e.g., access point 14 in this example) and a software element in the user terminal (e.g., terminal 10 in this example) known as an EAP Peer. EAP is well-known to persons skilled in the art and is therefore not described herein in further detail. It is sufficient to note that, among the messages defined by EAP, there is defined an Identity Request, which is a message requesting the EAP Peer to provide some information, such as its identity, in order to start the authentication process. Although EAP and the EAP Identify Request are described with regard to the exemplary embodiment of the invention, in other embodiments other protocols and the messages associated with those protocols may be suitable.

The EAP Peer in terminal 10 recognizes and responds to the Identity Request. The EAP Peer and other elements of terminal 10 are conventional and well-known in the art and are therefore not described herein in further detail. In response to the EAP Identity Request, the EAP Peer causes terminal 10 to communicate 48 to access point 14 an EAP Identity Response containing Network Access Identifier (NAI) that identifies the call as an emergency call. A conventional NAI is an identifier that represents the subscriber or user identity and typically has the form of user@realm, where the part preceding the ampersand identifies the user, and the part that identifies the user's home network 18 is the "realm." For example, an NAI joe@operator1.com would indicate that the user is known as "joe," and the user's home network 18 is known as "operator1." In accordance with this embodiment of the present invention, however, the NAI can take the form of, for example, e911@e911.com, joe@e911.com, e911@anyoperator.com, joe@e911.anyoperator.com or some other form that conveys that the call is an emergency (e.g., "911") call. Note that, unlike a conventional NAI, these exemplary NAI's do not attempt to identify both the user and realm, because in this example AAA server 16 does not attempt to authenticate the user. As in the case of the Identity Request, it is sufficient to note that, among the messages defined by EAP, there is defined an Identity Response, which is an EAP message sent by the EAP Peer in response to the EAP Identity Request message. Although EAP and the EAP Identify Response are described with regard to the exemplary embodiment of the invention, in other embodiments other protocols and the messages associated with those protocols may be suitable.

Access point 14 then communicates 50 to AAA server 16 the identifying information conveyed by the NAI using the EAP Identity Response message encapsulated in an AAA protocol such as RADIUS. In an embodiment in which RADIUS is used, the message will be encapsulated in a RADIUS Access-Request message. RADIUS is a well-known authentication, authorization and accounting protocol defined by IETF and is used to control network access.

In response to the NAI information that identifies the call as an emergency call, AAA server 16 communicates 52 with terminal 10, with terminal 10 using any dummy credentials, resulting in AAA server 16 granting terminal 10 limited access. The access is limited in the sense that terminal 10 is only permitted to communicate with the emergency call system (e.g., emergency call center 40) and not with any other party. Once such limited access is granted, access network 12 provides a communication connection 54 in any suitable manner between terminal 10 and the elements of the emergency call system that handle incoming telephone calls. Access network 12 can also provide information indicating its location (i.e., the location of the hotspot and thus the location of the user) and route the location information to the local emergency call system. The emergency call system may include routing elements that direct the incoming call to an appropriate call center 40 based on the geographic location of the user/hotspot.

Figure 3:
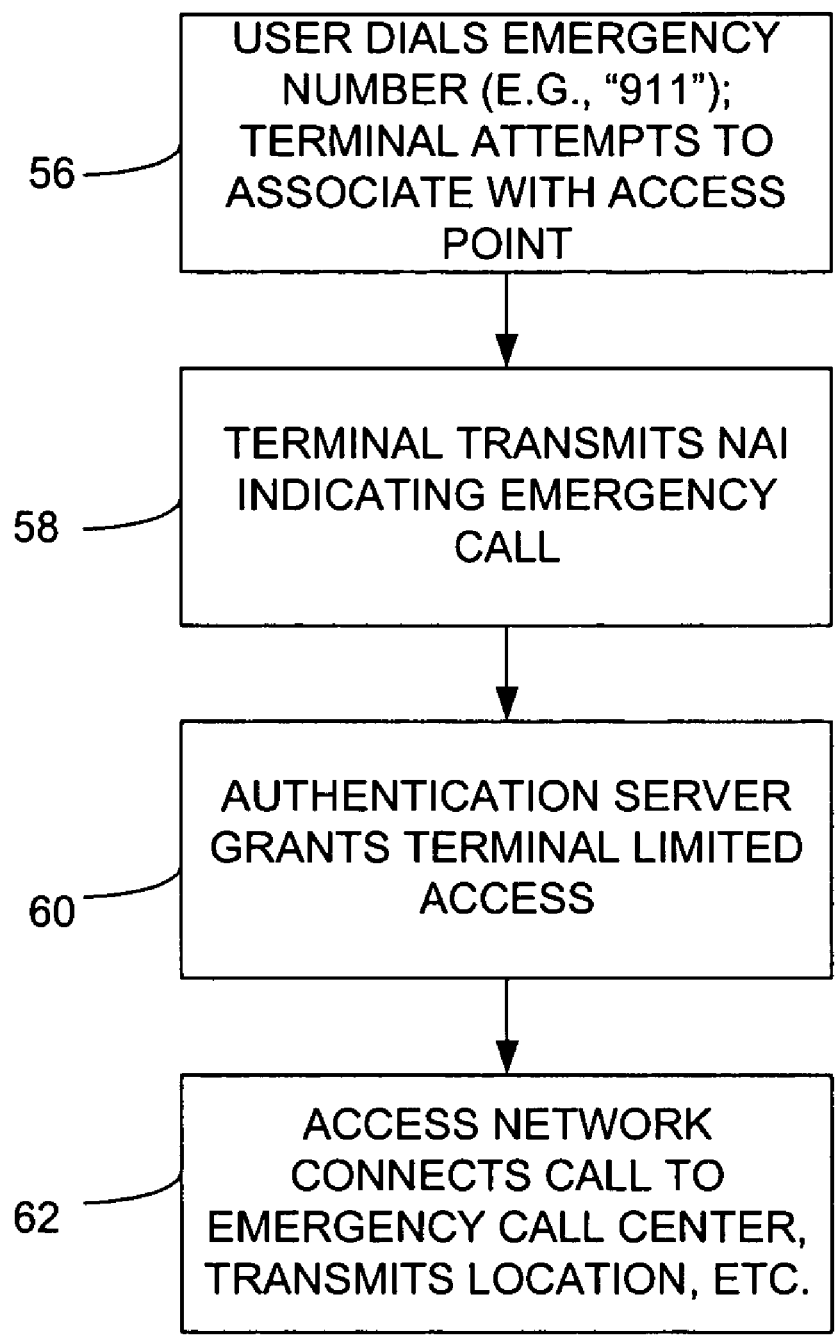
FIG. 3 is a flow diagram illustrating an exemplary method of operation of the system of FIG. 1.

The above-described communication sequence can be summarized with regard to FIG. 3. At step 56, the user dials the emergency number (e.g., "911"), and terminal 10 communicates with access point 14. At step 58, terminal 10 transmits information identifying the call as an emergency call. At step 60, in response to the identifying information, AAA server 16 grants terminal 10 limited access for the purpose of allowing terminal 10 to communicate with an emergency call center 40. At step 62, access network 12 connects the user with call center 40, and the user can speak with an emergency operator who can view the user's location and dispatch assistance if needed.

Figure 4:
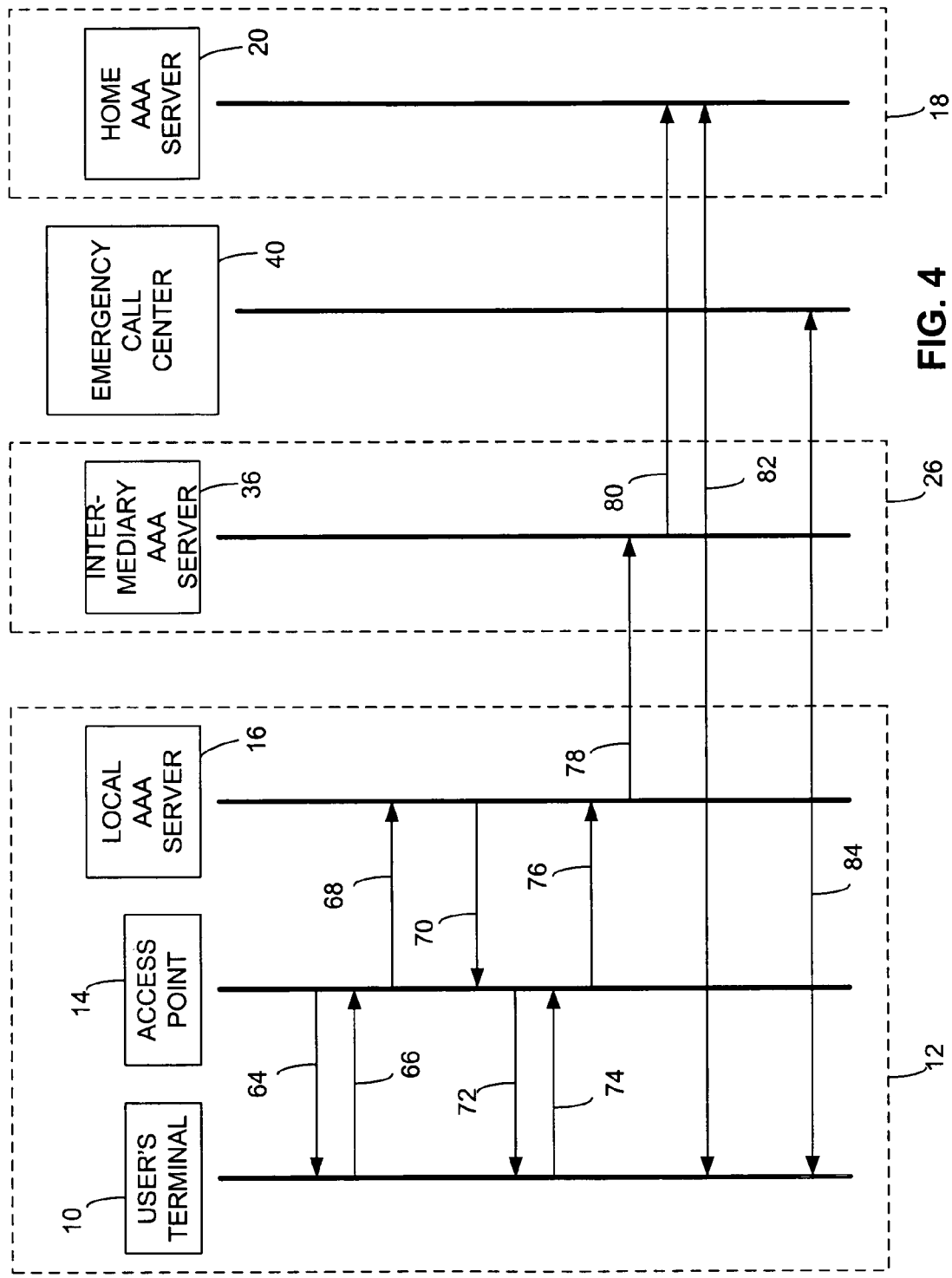
FIG. 4 is a communication sequence diagram illustrating another exemplary sequence of communications among the elements depicted in FIG. 1.

As illustrated in FIG. 4, in another example of an instance in which a user of terminal 10 attempts to access the network, terminal 10 indicates the user's preference for a network that could support emergency calls if needed. In this example, the following sequence of communications occur. When terminal 10 is in the hotspot, terminal 10 initiates communication with access point 14. Access point 14 then communicates 64 an Extensible Authentication Protocol (EAP) Identity Request to terminal 10. In response, the EAP Peer causes terminal 10 to communicate 66 to access point 14 an EAP Identity Response containing an NAI that identifies the user, the user's home network, and the user's preference or request to be on networks supporting emergency calls, such as joe@e911.operator1.com, where the user part is "joe" and the realm part identifies the user preference of networks supporting emergency calls, via "e911" and the user's home network as "operator1." Access point 14 in turn communicates 68 this information to AAA server 16.

In response to the NAI information that identifies the call as an emergency call and identifies the user's home network, AAA server 16 determines intermediary networks through which the call could be routed that support emergency calls. For example, AAA server 16 can maintain a database listing intermediary network operators with which its operator has roaming agreements and that support emergency calls. As described above, the term "support" or "handle" emergency calls means that the networks are capable of meeting requirements for how such calls must be handled, such as those requirements that may be imposed by governmental authorities. For example, it may be required that location information be transmitted along with the call to the local emergency call center. The realms may include a term that indicates they support emergency calls: E.g., "e911.operator1.com."

AAA server 16 communicates 70 an Access-Challenge message packet to access point 14. The Access-Challenge message packet encapsulates an EAP Identity Request containing the identities of those intermediary networks that AAA server determined are capable of handling emergency calls. Access point 14 in turn communicates 72 this information to the EAP Peer of terminal 10. The act of communicating 72 information identifying one or more intermediary networks is known in the art as "advertising" the intermediary networks to terminal 10.

Terminal 10 can then select one or more of the advertised intermediary networks. Suitable processes or methods by which terminal 10 can select intermediary operators are conventional and well-understood in the art and are therefore not described in further detail herein. The EAP Peer can then "decorate" an NAI in the manner known in the art and respond to the Access-Challenge by communicating 74 an Identity Response containing the decorated NAI. "Decoration" is a term that refers to adding realm information to the NAI for the intermediary operators. The following is an example of an NAI decorated in a manner that identifies selected intermediary networks: homerealm.example.net!user@otherrealm.example.net. In this example, the realm information before the exclamation point ("!") indicates the user's home network, while realm information after the ampersand ("@") indicates the intermediary network selected by the EAP Peer. Access point 14 then communicates 76 this EAP Identity Response to AAA server 16.

From the decorated NAI, AAA server 16 is able to identify another AAA server to which the message containing the decorated NAI can be properly forwarded. The next-hop AAA server is indicated by the realm information after the ampersand ("@") in the decorated NAI. In the example above, AAA server 16, by looking at the decorated NAI homerealm.example.net!user@otherrealm.example.net, is able to identify "otherrealm.example.net" as the realm of the next-hop AAA server to which this AA message is to be forwarded. That AAA server, in turn removes "otherrealm.example" from the NAI (i.e., it removes the decoration) and moves the realm information from before the exclamation point (T) to after the ampersand ("@"). Thus, the updated NAI would become user@homerealm.example.net. Based on the realm information after the ampersand ("@"), the AAA server would now forward the AAA message to the user's home realm. In this way, the AAA servers are capable of identifying the next AAA server in the path or chain leading to AAA server 20 of home network 18. For example, AAA server 16 may determine from the decorated NAI it receives that it should communicate 78 the message containing the decorated NAI to AAA server 36 of intermediary network 26. In turn, AAA server 36 determines that it should communicate 80 the message to AAA server 20 of home network 18. Once the initial communication from AAA server 36 to AAA server 20 has been made, the authentication conversation 82 between them can occur in the conventional manner. If the conversation results in the user being authenticated, then whenever the user initiates a call thereafter (e.g., by dialing "911"), the call is connected 84 via intermediary network 26 to the local emergency call center 40 (as indicated by communication link 44 in FIG. 1).

Figure 5:
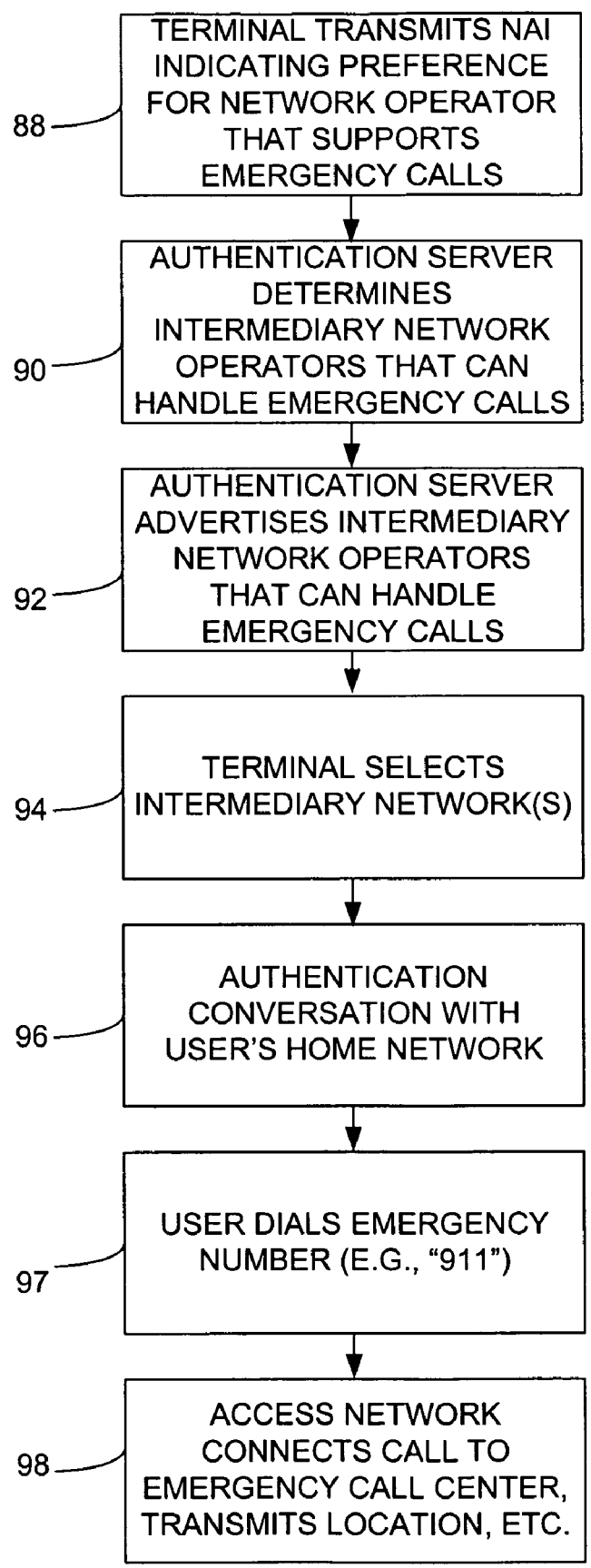
FIG. 5 is a flow diagram illustrating another exemplary method of operation of the system of FIG. 1.

The above-described communication sequence can be summarized with regard to FIG. 5. At step 88, after terminal 10 has initiated communication with access point 14 as a result of the user entering the hotspot, terminal 10 transmits information indicating a preference for using network that can support emergency calls. Terminal 10 can be pre-provided with an indication of the user's network preference at any suitable time, such as at the time terminal 10 is provisioned or in response to terminal 10 querying the user to enter a preference. At step 90, in response to the identifying information, AAA server 16 determines intermediary network operators that are capable of handling emergency VoIP calls. At step 92, AAA server 16 advertises those intermediary network operators to terminal 10. At step 94, terminal 10 can select one or more of the advertised intermediary network operators. At step 96, an authentication conversation can take place between terminal 10 and the user's home network via the intermediary network operators. At step 97, which can occur at any time thereafter, the user may decide to make an emergency phone call (e.g., by dialing "911"). In response, access network 12 connects the user with call center 40 at step 98, as the user has already been authenticated. The user can speak with an emergency operator at call center 40, who can view the user's location and dispatch assistance if needed. the user dials the emergency number (e.g., "911"), and terminal 10 communicates with It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. For example, although the invention has been described as applicable to WLAN, it can be applied to any other suitable access technology for which it is known to use EAP-based authentication or for which it would occur to persons skilled in the art to use EAP-based authentication in view of the teachings herein. With regard to the claims, no claim is intended to invoke the sixth paragraph of 35 U.S.C. Section 112 unless it includes the term "means for" followed by a participle.

What is claimed is:

1. A method for placing an emergency voice-over-Internet Protocol (VoIP) call from a terminal in communication with an access network that is disparate from a home network of the terminal, the method comprising:
   receiving, at the access network, an identity response from the terminal that includes a Network Access Identifier (NAI) comprising information indicative of emergency calling;
   determining that the terminal is at least one of initiating or has initiated an emergency call based on the NAI; and
   granting access to the terminal, in response to the determining, wherein the access is limited to enabling communication with an emergency call center via at least one of the access network or one or more intermediary networks, without authenticating the terminal.

2. The method claimed in claim 1, wherein, the receiving the identity response that includes the NAI comprises receiving the information indicative of the emergency calling within at least one of a user portion or a realm portion of the NAI.

3. The method claimed in claim 1, further comprising, receiving information, from the terminal, indicating a preference for each of the one or more intermediary networks through which the emergency VoIP call is to be routed, wherein the granting access includes allowing access only to the emergency call center via the at least one of the access network or a set of the one or more intermediary networks based in part on the received preference.

4. The method claimed in claim 1, further comprising, identifying a set of the one or more intermediary networks that support emergency call-handling capability based in part on data stored in a local database.

5. The method claimed in claim 4, further comprising,
   transmitting information associated with the set of the one or more intermediary networks to the terminal; and
   receiving an intermediary network selection from the terminal in response to the transmitting of information.

6. The method claimed in claim 1, wherein the receiving includes receiving an Extensible Authentication Protocol (EAP) Identity Response from an EAP Peer of the terminal in response to an EAP Identity Request, the EAP Identify Response comprises the NAI, which indicates that a call initiated by the terminal is an emergency VoIP call.

7. The method claimed in claim 1, further comprising, transmitting to the emergency call center, information indicating a location of an access point of the access network, to which the terminal connects.

8. The method claimed in claim 1, further comprising, communicating authentication information via at least one of the one or more intermediary networks that connect the access network and the home network to which the terminal subscribes.

9. The method claimed in claim 1, further comprising, transmitting an EAP Access Challenge message packet encapsulating an EAP Identity Request comprising information identifying the one or more intermediary networks that support emergency call-handling capability.

10. The method claimed in claim 9, wherein the receiving includes receiving from an EAP Peer of the terminal the Identity Response including the NAI decorated with an indication of a selection of the one or more intermediary networks.

11. A system for controlling placement of an emergency voice-over-Internet Protocol (VoIP) call from a terminal in communication with an access network, the system comprising:
   an access point, within the access network, that receives information from the terminal including a Network Access Identifier (NAI) that is indicative of emergency calling associated with a VoIP call, the access network is different from a home network to which the terminal subscribes; and
   an authentication, authorization and accounting (AAA) server, local to the access network, that allows the terminal access to only one or more emergency call centers via at least one of the access network or one or more intermediary networks regardless of authentication the terminal, if the NAI indicates that the terminal is at least one of initiating or has initiated the emergency VoIP call.

12. The system of claim 11, wherein the AAA server allows the terminal to communicate with the one or more emergency call centers without receiving authorization information associated with the terminal from the home network.

13. The system of claim 11, wherein:
   the information received from the terminal includes information indicating a preference for each of the one or more intermediary networks through which the emergency VoIP call is to be routed; and
   the AAA server allows access to one or more emergency call centers via a set of the one or more intermediary networks that support emergency call-handling capability, the set selected based in part on the preference.

14. The system of claim 11, wherein the access point receives an Extensible Authentication Protocol (EAP) Identity Response from an EAP Peer of the terminal in response to an EAP Identity Request sent by the access point, the EAP Identify Response includes at least the NAI.

15. The system of claim 11, further comprising a database local to the AAA server that stores information associated with emergency call-handling capability of each of the one or more intermediary networks, the AAA server facilitates transmission of the stored information to the terminal.

16. The system of claim 15, wherein the AAA server communicates an access-challenge message to the access point, the access-challenge message includes a set of identities of the one or more intermediary networks that support emergency call-handling.

17. The system of claim 16, wherein the access point transmits information from the access-challenge message to the terminal and in response receives an intermediary network selection from the terminal.

18. The system of claim 11, wherein the access network routes information, including a location of the access point, to the one or more emergency call centers.

19. The system of claim 11, wherein the AAA server facilitates authentication conversation with the home network via the one or more intermediary networks to at least one of authorize the terminal, authenticate the terminal, or account for network usage by the terminal.

20. A system for controlling placement of an emergency voice-over-Internet Protocol (VoIP) call from a terminal roaming within access network that is not the terminal's home network, the system comprising:

means for receiving, within the access network, information from the terminal indicating that a VoIP call initiated by the terminal is an emergency VoIP call, the information is included within a Network Access Identifier (NAI);

means for allowing the terminal to access the access network without performing authentication of the terminal with the home network, wherein the access is limited to utilization of the access network for communication with an emergency call center during the emergency VoIP call via zero or more intermediary networks; and means for routing location information, indicative of a geographical location of the means for receiving, to the emergency call center.

* * * * *